(12) United States Patent
Bersiek

(10) Patent No.: US 10,936,027 B2
(45) Date of Patent: Mar. 2, 2021

(54) POWER DISTRIBUTION SYSTEM

(71) Applicant: Shamel A. Bersiek, Laguna Hills, CA (US)

(72) Inventor: Shamel A. Bersiek, Laguna Hills, CA (US)

(73) Assignee: TRILOGY LLC, Aliso Viejo, CA (US)

( * ) Notice: Subject to any disclaimer, the term of this patent is extended or adjusted under 35 U.S.C. 154(b) by 137 days.

(21) Appl. No.: 15/739,940

(22) PCT Filed: Jun. 27, 2016

(86) PCT No.: PCT/US2016/039618
§ 371 (c)(1),
(2) Date: Dec. 26, 2017

(87) PCT Pub. No.: WO2016/210427
PCT Pub. Date: Dec. 29, 2016

(65) Prior Publication Data

US 2018/0196481 A1    Jul. 12, 2018

Related U.S. Application Data

(60) Provisional application No. 62/185,397, filed on Jun. 26, 2015.

(51) Int. Cl.
| | |
|---|---|
| G06F 1/18 | (2006.01) |
| H02J 3/04 | (2006.01) |
| H02J 3/00 | (2006.01) |
| G06F 1/26 | (2006.01) |
| G06F 1/30 | (2006.01) |

(52) U.S. Cl.
CPC .............. *G06F 1/189* (2013.01); *G06F 1/263* (2013.01); *G06F 1/30* (2013.01); *H02J 3/005* (2013.01); *H02J 3/04* (2013.01)

(58) Field of Classification Search
None
See application file for complete search history.

(56) References Cited

U.S. PATENT DOCUMENTS

| | | |
|---|---|---|
| 6,191,500 B1 | 2/2001 | Toy |
| 6,608,406 B2 | 8/2003 | Bersiek |
| 7,271,506 B1 | 9/2007 | Bersiek |
| 2003/0023888 A1* | 1/2003 | Smith ................... G06F 1/263 |
| | | 713/300 |
| 2011/0204807 A1 | 8/2011 | Hashizume et al. |

(Continued)

FOREIGN PATENT DOCUMENTS

WO    2015094290 A1    6/2015

OTHER PUBLICATIONS

EPO extended European Search Report for related application 16815496.1 dated Feb. 1, 2019; 9 pp.

(Continued)

*Primary Examiner* — Jared Fureman
*Assistant Examiner* — Aqeel H Bukhari
(74) *Attorney, Agent, or Firm* — Armstrong Teasdale LLP

(57) ABSTRACT

An electrical power distribution system and apparatus is provided that that is comprised of multi-source connections, multi-load connections and bi-directional connections, where the system is configured to be multi-functional, hot swappable, changeable, expandable, configurable and controllable.

14 Claims, 12 Drawing Sheets

(56) References Cited

U.S. PATENT DOCUMENTS

2012/0284539 A1\* 11/2012 Cheng ................... G06F 1/263
                                                     713/300
2014/0177308 A1   6/2014 Morita et al.
2014/0319911 A1  10/2014 Alexander
2015/0115743 A1   4/2015 Guse et al.
2017/0093166 A1\*  3/2017 Owen .................... G06F 1/263

OTHER PUBLICATIONS

EPO Examination Report for related EP patent application 16815496.1 dated Jun. 6, 2020; 8 pp.

\* cited by examiner

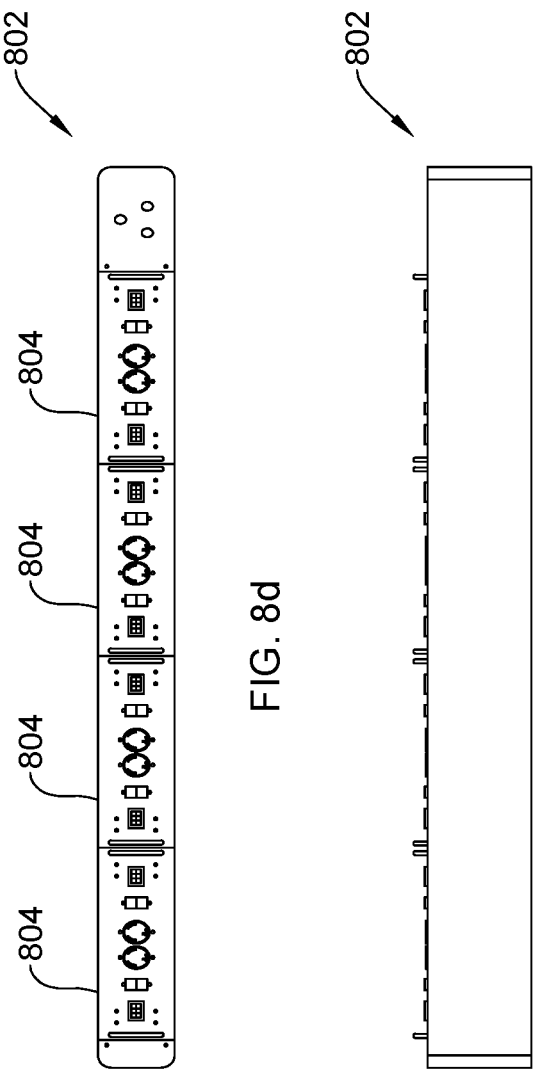
FIG. 8d
FIG. 8b
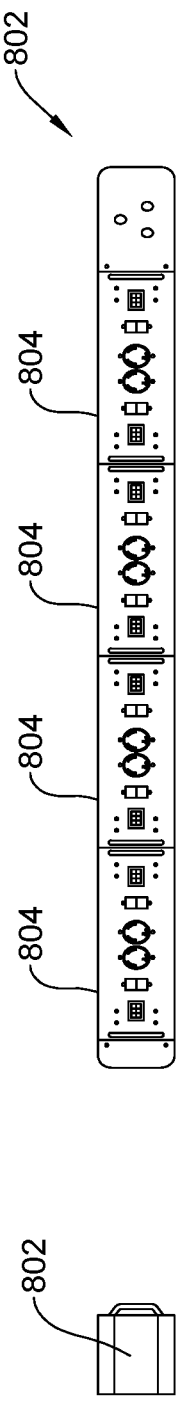
FIG. 8c
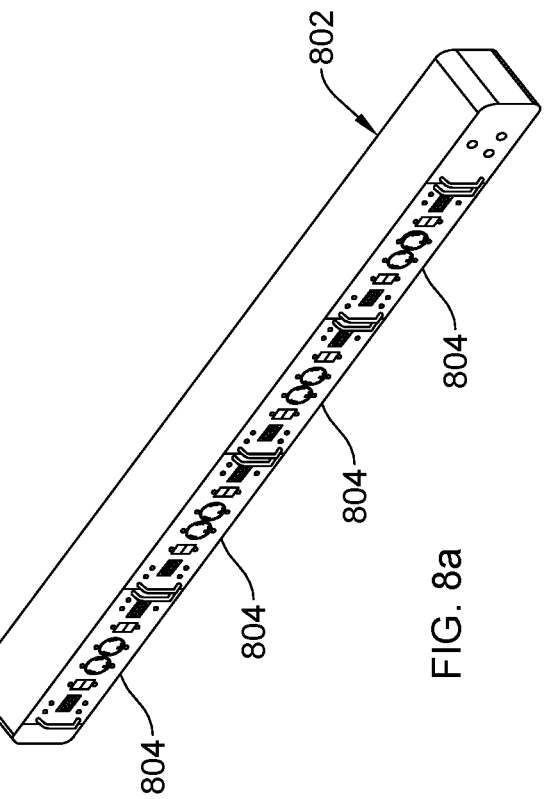
FIG. 8a

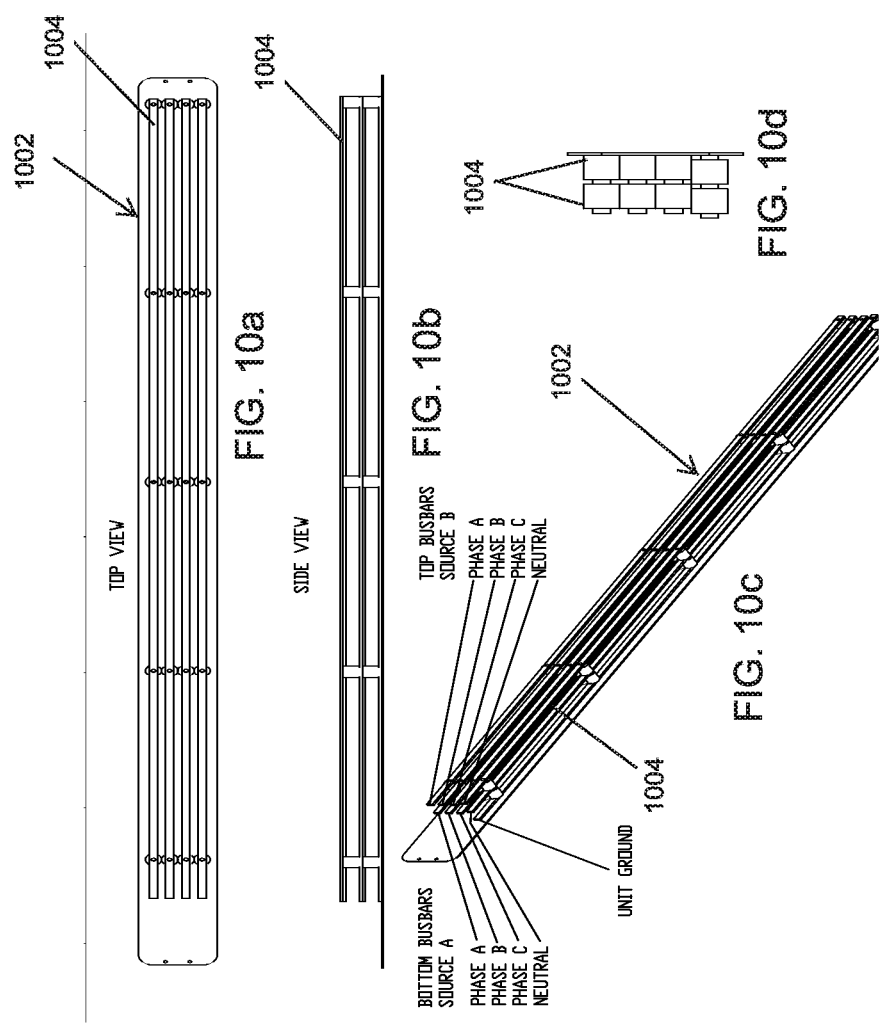

POWER DISTRIBUTION SYSTEM

RELATED APPLICATIONS

This application is a National Stage Entry of PCT/US2016/039618 filed Jun. 27, 2016, which claims the benefit and priority of U.S. Provisional Patent Application Ser. No. 62/185,397, titled POWER DISTRIBUTION SYSTEM, filed Jun. 26, 2015, which application is incorporated in its entirety by reference in this application.

BACKGROUND

1. Field of the Invention

The present invention generally relates to electrical power distribution apparatus and more particularly relates to multi-function bi-directional power distribution and transfer apparatus.

2. Related Art

Research and development of computer technology has continually produced smaller and more compact computer systems. New computers and servers are usually designed with two redundant power supplies that are connected to two plugs that could be connected to one or more different sources of power. In conventionally designed data centers, the power distribution depends on the number of power sources available to the data center. A single source of power is usually called "1N" and two sources of power usually called "2N." In a 2N configuration, the two isolated sources of power are commonly called side "A" and side "B." However, in server room facilities the electrical power distribution switchgears, units and systems for supplying power to electrical devices, such as computers, servers, racks and other critical equipment have remained bulky and limited to one power source (1N). Therefore, in order to utilize two power sources and distribute such sources effectively, conventional data centers require double the amount of equipment. In addition, the power distribution and utilization equipment are usually not expandable and limited to the initial design and installation.

The common definition of an "xN" configuration is a power system that usually consist of "x" number of separate or isolated power sources, distribution system, loads and/or paths, such as 1N, 2N, 3N etc. The sources of power can be utility power, generators, uninterruptible power supplies ("UPS") systems or other power and energy sources and load equipment. For example, in a "2N" system, there are two separate power sources, source "A" and "B." Power and distribution equipment is utilized to connect the power from power source "A" to load "A" and power source "B" to load "B". Commonly source "A" feeds power to load "A" and source "B" feeds power to load "B".

An "N+y" configuration can consist of one or more power sources ("xN") and one or more ("y") number of redundant or alternate power sources. For example, source "A" feeds power to load "A", but redundant source "y" is usually an alternate source of power, such as utility power and backup generators, that can feed and connect to load "A" in the event of main source "1N" ("A") failure or absence. For example, in a N+1 system the main source of power "N" is connected to the single output connection, for example load "A", and the "+1" indicates an additional power source that can connect to load "A" in the event of failure or absence of the main source "N".

In a conventional "1N" single source, distribution and load the electrical configuration of a data center can consist of a power source feed that connects the incoming power to free-standing equipment designed with a single source input that is then passed through and connects the power to the output load. Such equipment is, for example, power distribution units or switchgears, uninterruptable power supply (commonly called UPS systems) and power distribution units (PDUs). In a conventional facility with a 2N configuration with two power sources and loads ("A" and "B"), the distribution and power equipment is doubled or duplicated to side "A" and side "B" separately. Sides "A" and "B" are usually isolated and cannot be combined or transferred from one side to the other due to synchronization and other power limitations issues.

In a conventional isolated 2N UPS system design, each UPS connects to battery banks. The batteries for each UPS are designed to deliver battery power for a certain calculated and/or desired amount of time, usually called battery run time. Each isolated UPS, for example UPS "A" and UPS "B," must be individually designed with battery bank capacity that delivers the required battery run time. In a conventional isolated two UPS setup (2N or N+1 redundant), UPS "A" and UPS "B" are independently equipped and connected to battery banks that deliver the required battery run time, so in the event of a UPS failure (either UPS "A" or "B"), the UPS load can still have the required battery run time, thus doubling the amount of battery to accommodate the required run time in the event of one side UPS failure. For example, a facility that is designed with 30 minutes of battery runtime will require that each isolated/redundant UPS ("A" or "B") to be connected to batteries that can deliver 30 minutes runtime. Doubling the battery size is costly, especially with common battery replacement required every 3-5 years and added cost of structural bracing and retrofits. In addition, the amount of batteries allowed in a building or facility are limited due to growing fire department regulations regarding the maximum amount of batteries and/or electrolytes allowed in buildings.

Conventional power distribution units ("PDUs") are usually equipped with breakers, transformer and output distribution panels. Existing PDUs usually receives power from one power source (for example utility power or UPS) and connects the power to the output section of the PDU (for example to electrical panels and/or breakers). Usually the output panels and breakers are then connected to the multiple loads or equipment via conduits and wires. Some conventional two input source PDUs, configured as an "N+1", usually include input static switches or breakers, transformers and output distribution panels. The conventional two input source PDUs usually receives the power from the two sources and connects only one of the power sources to the load circuits and equipment (usually comprised of one or multiple output distribution panels that feed servers or other equipment). The conventional PDUs equipped with two input power sources connects and passes through the power either from side "A" or "B" to the output load, but cannot deliver the power from both sources simultaneously to the output load. The conventional two input source PDUs are usually called "N+1" and connects only one of the sources to the output load distribution. The other source remains unutilized and is considered a backup source. In the event of a failure on the primary source, the load can be transferred to the secondary source of power.

In conventional PDUs, the output distribution panels are situated within the enclosure. Once the output panels are populated with load circuit breakers, the panels cannot accommodate more load breaker and thus require additional section to be added to the PDU for expansion. The addition of a section to the PDU requires a shutdown of the PDU, as the power cable connection needs to be hard wired and connected to the PDU main circuitry.

Furthermore, conventional PDU output circuits are independently hard-wired to cables and/or wires that are passed through conduits for distances of up to about 200 feet or more, to individual racks and/or components of critical equipment, such as servers. Usually a total conduit run of one source power, such as an "A" side to load "A", can be up to about 5000 feet per PDU and double the amount for a conventional 2N design that requires two PDU s, one for each source and load, such as "A" and "B." This wiring is often run through raised floors, ceiling and walls of the facility during the electrical wiring phase of the building construction or during additions or expansions. Electrical outputs initiating from such free-standing PDUs are typically provided as cables and conduits that are accessible through walls and floors of the facility.

Electrical needs in a data center or server room frequently change, typically by an increase in demand for more load and output circuits and different receptacle types to accommodate new and/or additional pieces of equipment. More recently server room load equipment, such as servers and computers, are equipped and designed with two input plugs for redundancy, usually called side "A" and side "B". Furthermore, once the power is delivered to the computer racks it connects to power strips. The power strips usually include a number of plug receptacles that has a single circuit breaker, which may be connected to one circuit originating from the PDU or a wall receptacle. However, in many cases, a power strip is not appropriate or sufficient for large-scale changes in electrical needs, or for accommodating additional pieces of critical equipment that requires hard-wired connections to the power source or PDU.

The process of re-cabling and/or adding electrical output circuits from the PDU, for example to more racks or strategic locations within the data center facility, are a costly, labor intensive task, which typically requires the work of outside contractors who specialize in electrical cabling and rewiring. Because of the inherent difficulty of accessing a specific wire or cable from the numerous and sometimes tangled masses of cables and wires concealed within walls or floors of the facility, obsolete and unusable cables are often left in place, adding to the confusion and difficulty of maintaining or controlling such wiring.

One recent solution to current problems with PDU systems is found in U.S. Pat. Nos. 6,608,406 and 7,271,506 for RACK MOUNTABLE POWER DISTRIBUTION SYSTEM, the entire disclosures of which is incorporated herein by this specific reference, which disclose a very useful power distribution system that provides a convenient replacement for a conventional, freestanding PDU. While such PDUs address some concerns with the utilization and distribution of power sources and helps to limit the amount of wiring required from the PDU s to the equipment, such PDU do not address all the concerns with growing data center requirements.

Growing data center expansion requires power equipment that is capable of handling two or more power sources and loads and which is modular, flexible, controllable and expandable without the need of power shutdown to the facility or load during expansion or additions.

SUMMARY

The present invention provides an electrical power distribution system and apparatus that is comprised of multi-source connections, multi-load connections and bi-directional connections, where the system is configured to be multi-functional, hot swappable, changeable, expandable, configurable and controllable. The power distribution system can be incorporated into a transfer switch, a battery back-up switch a PDU or an HPDU/RPDU unit.

The electrical power distribution system of the present invention, whether incorporated into any of the following transfer switch, a battery back-up switch a PDU or an HPDU/RPDU unit, comprises at least a first and second power source input assembly, each connected to a power supply and at least a first and second power source output assembly. The first power source input assembly and the first power source output assembly have at least a first and second electrical power connection running between the input and output assemblies. Similarly, the second power source input assembly and the second power source output assembly have at least a third and fourth electrical power connection running therebetween. The invention further includes a bidirectional switch electrically connecting the first electrical power connection to the third electrical power connection and electrically connecting the second electrical power connection to the fourth electrical power connection. The switch, by opening and closing the circuit between the connections can then cause the power supply from the first power source input assembly to be delivered to the second power output assembly and can cause the power supply from the second power input assembly to be delivered to the second power output assembly.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

FIG. 8a is a top perspective view of the housing 802 illustrating the removable modules 802 on the front the housing.

FIG. 8b is a top view of HPDU housing.

FIG. 8c is a side view of an HPDU housing.

FIG. 8d is a front view of a HPDU housing showing removable front modules.

FIG. 10a illustrates a top view of one example of bus bar assembly.

FIG. 10b illustrates a side view of one example of a bus bar assembly.

FIG. 10c illustrates a bottom perspective view of the bus bar assembly.

FIG. 10d illustrates a side view of one example of a bus bar assembly.

DETAILED DESCRIPTION

Figure 1:
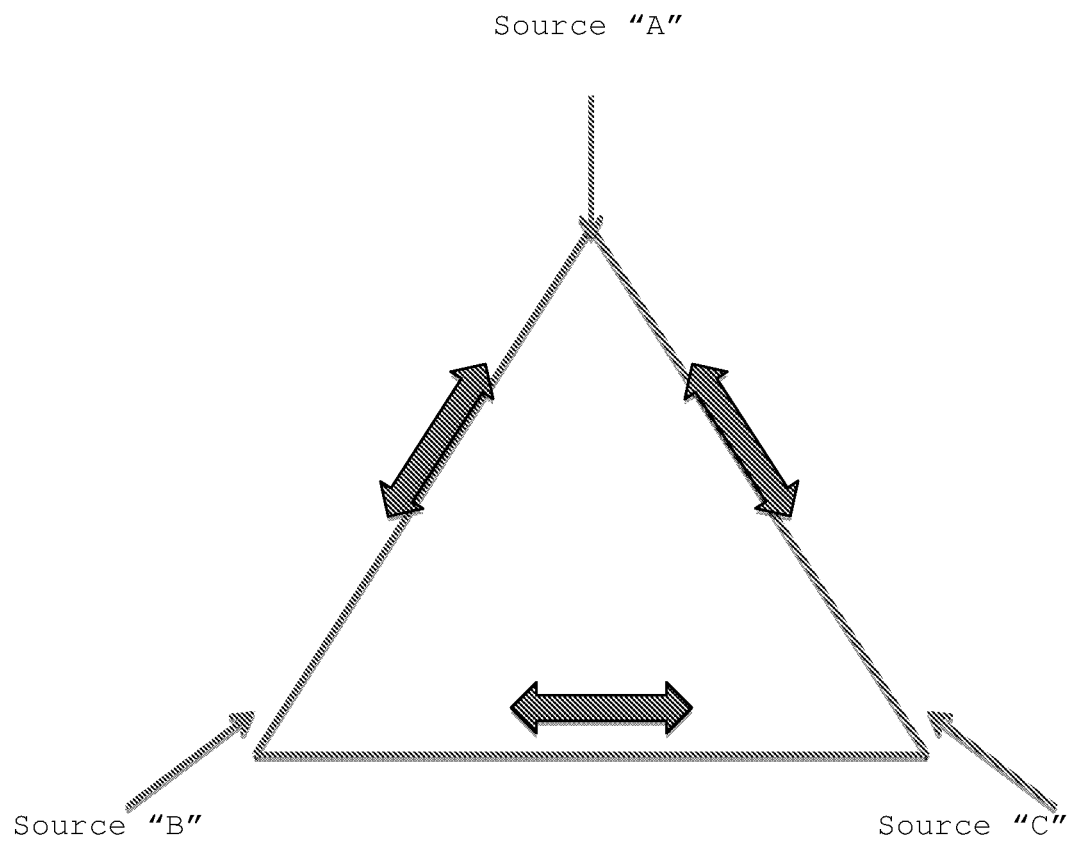
FIG. 1 is a layout of the total view describing the principal functionality and operation of the 3N+2 devices and apparatus in this invention.

As illustrated in the attached figures, a new multi-function, multi-channel and bidirectional electrical power distribution system is provided by the present invention. The system includes, but is not limited to, multi-source connections, multi-load connections and bi-directional connections. The distribution system of the present invention can be multi-functional, hot swappable, changeable, expandable, configurable and controllable. The system is more efficient, compact in design and cost effective than traditional equipment. The present system provides versatility and flexibility in meeting electrical power in a 2N, 3N or xN environment.

In a broad aspect, the system of the present invention (xN+y) is comprised of several devices. Each device or apparatus in this invention can function and operate independently, in partial combination or as part of a total system. For the purpose of this invention, the xN+y electrical power system comprises several apparatus or devices. Each included apparatus or device is an invention on its own and can function independently, in partial and/or in combination with the other included devices. The present invention is an xN+y electrical power system with multifunction capability. The devices and apparatuses comprised in this invention are described in a 2N+ configuration, to simplify the principle description and operation of the invention. Nevertheless, the ultimate redundancy and flexibility is the 3N+2 redundancy configuration. These and other aspects of the present invention will become apparent in the following detailed description. Particularly in conjunction with the accompanying drawings in which like parts bear like reference numerals.

Further, the system of the present invention can include programmable electronic logic circuitry that can interface with various electrical equipment and devices of the system. The logic circuitry and computers interfacing with the logic circuitry can monitor the power, equipment status, electrical operation and electrical parameters in a facility or electrical equipment and provide sequential and/or synchronized operation of electrical devices in a facility and devices to achieve optimum efficiency, deliver maximum redundancy and provide uninterrupted power. The control logic in this invention can operate and connect to devices, equipment and computers through wires and/or in a wireless format. The logic, monitoring and control circuitry can be accessible locally within the facility and/or remotely via wireless, wired, and/or Internet connections. For example, the 2N+1 Xcross Unit (defined below) can be connected to two generators and two loads separately operating in a 2N mode. The electrical connection configured as generator A connects to load A and generator B connects to load B. In the event of generator A failure, the logic circuitry senses the failure and can be programmed to transfer and connect load A to generator B. If load A increases beyond the capacity of generator A and generator B has the available capacity to provide power to load A and load B together, the logic circuitry in this invention can monitor both generator A and B simultaneously and then connect and parallel both generators to provide power to both load A and B.

An additional function of this 3N+2 invention is power correction and efficiency optimization of devices and/or facility. The logic circuitry in this invention can monitor the electrical parameters on devices, equipment and/or facility and provide automatic and/or programmable step or sequential power correction for harmonics, power factor and electromagnetic noise utilizing the Xcross Unit in combination with active filters and/or passive filters such as capacitors and inductors circuitry, resulting in increased efficiency and power optimization.

FIG. 1 is a layout of the total view describing the principal functionality and operation of the 3N+2 devices and apparatus in this invention. As illustrated in FIG. 1, a 3N+2 system utilizes three separate sources of power (Source A, B and C) to be delivered to three separate loads. The system is configured as a bi-directional designs and allows for maximum redundancy. If any of the sources fail, two other sources can be connected to the supported load powered by the failed source. For example, in FIG. 1, if source "A" fails, the load connected to source "A" can be connected to source "B" or source "C". The 3N+2 can be implemented in multiple stages from the source to the load to increase the redundancy of the system.

Figure 2:
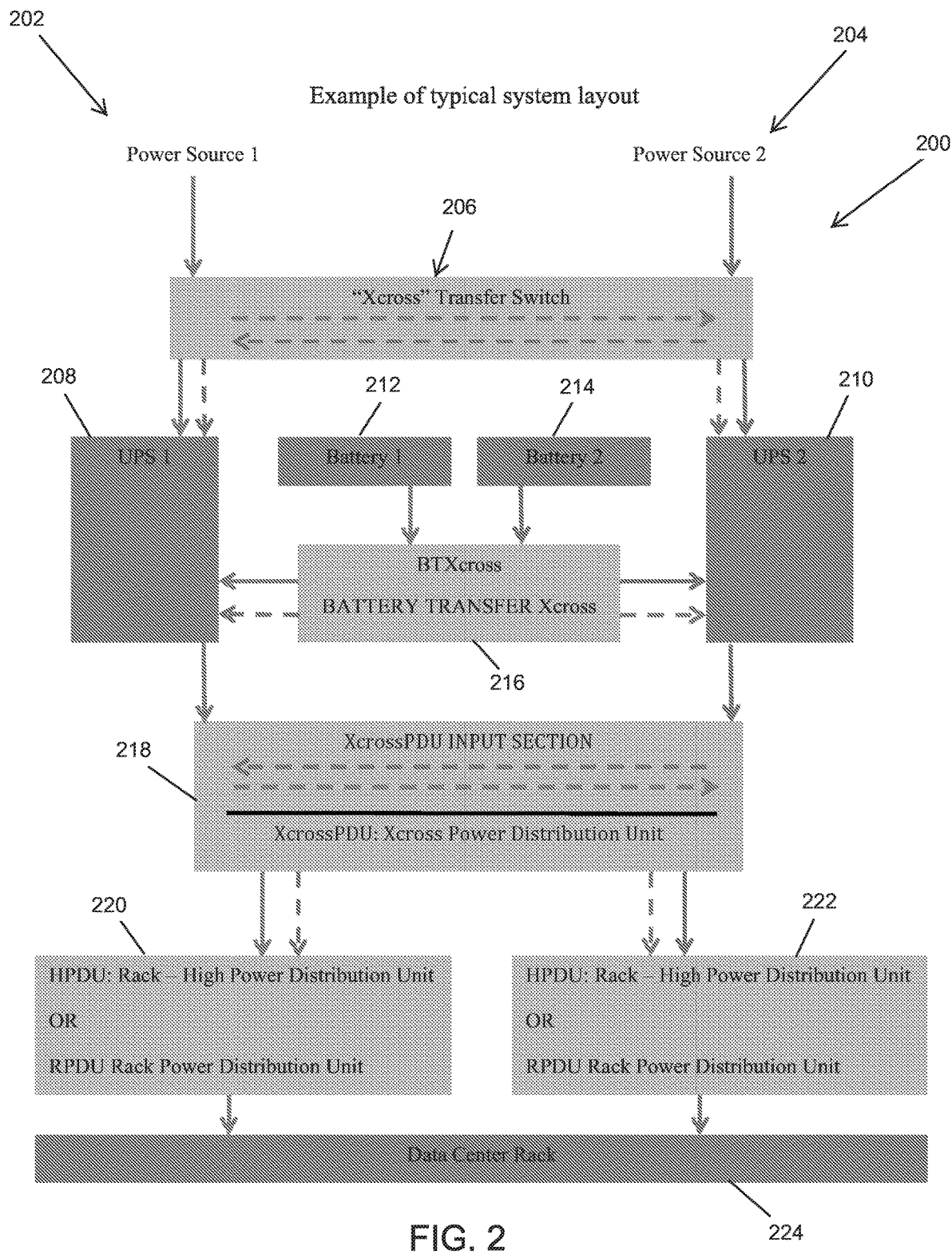
FIG. 2 is one example of a typical system layout of the invention.

FIG. 2 is an example of a typical system layout 200 of the invention. As illustrated in FIG. 2, one example system 200 may include two power sources 202, 204 as well as two battery backups 212, 214 all capable of providing power to UPS 1 and UPS 2 208, 210, respectively. The system layout 200 includes an Xcross Transfer Switch or Xcross Transfer Unit 206 positioned between power sources 1 and UPS 1 and power source 2 and UPS 2, which allows for the bidirectional flow of power from both power sources 202, 204 to both UPS 1 and UPS 2, 208, 210, as described further below. In this manner, if power source 1 fails, power source 2 can be utilized to power both UPS 1 and UPS 2 through the bi-directional flow of the Xcross transfer switch 206. Similarly, battery 1 and battery 2, 212, 214 also connect to a battery transfer Xcross ("BTXcross") 216 that allows for the bi-directional flow of the battery power 212, 214 between UPS 1 and UPS 2, 208,210. UPS 1 208 and UPS 2 210 then feed into an XcrossPDU 218 to allows for the bidirectional flow of the power from UPS 1 208 and UPS 2 210 between two separate PDUs 220, 222 both of which can act as alternative power sources for the equipment located on the data center rack 224. Electrical schematics are provided below for the 2N Xcross Transfer Unit 206, the BTXcross 216, XcrossPDU device 218, and HPDU/RPDU power distribution units 220, 222.

Figure 3:
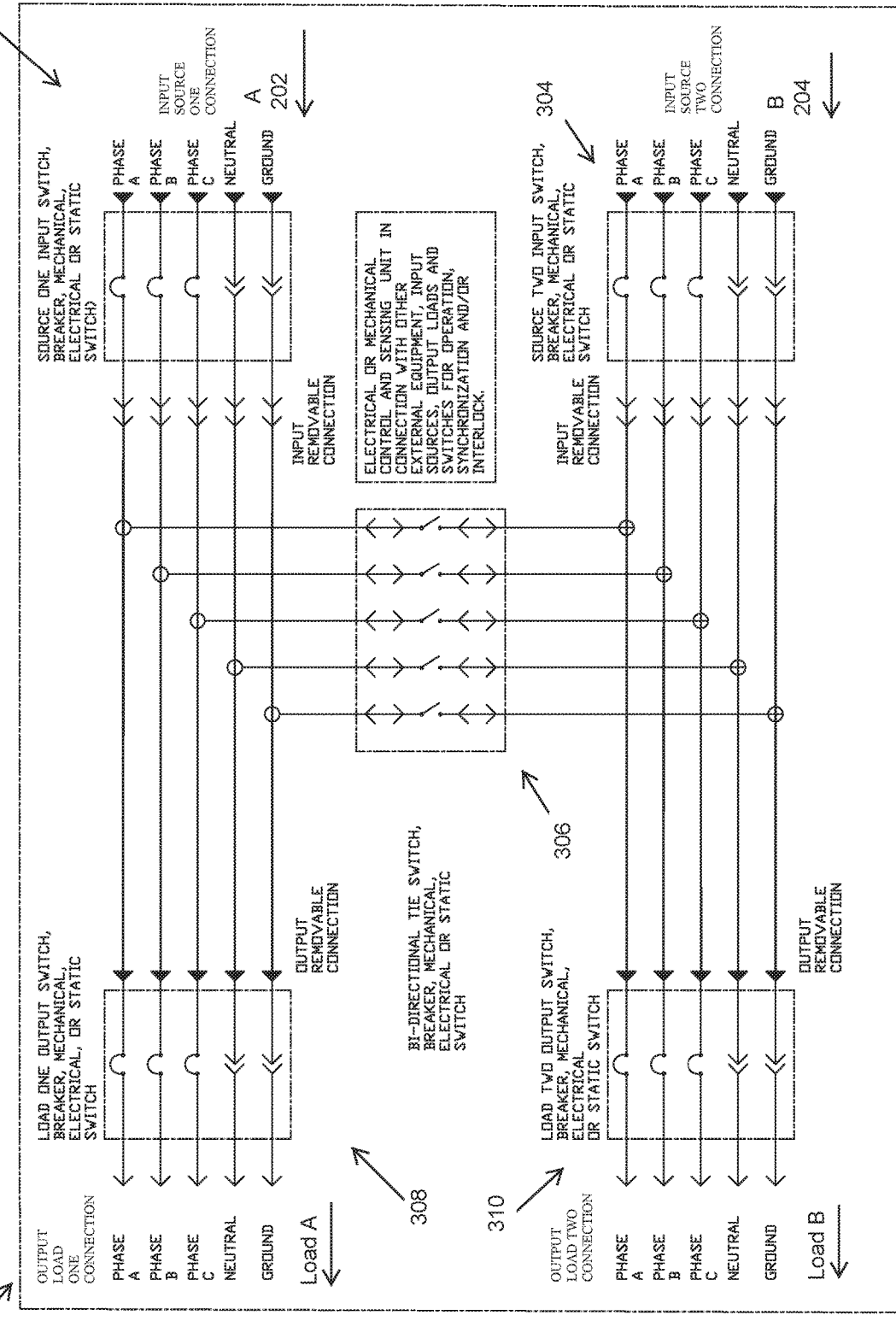
FIG. 3 is an electrical schematic of the wiring of one example of the 2N Xcross Transfer Unit.

FIG. 3 is an electrical schematic of the wiring of the 2N Xcross Transfer Unit 206. As will be explained further below, while the device is illustrated as a 2N+1 Xcross Transfer Unit 206, it may also be designed using the same principles as a 3N+2 Xcross Transfer Unit or a xN+y XCross Transfer Unit. The apparatus may also simply be referred to as a Xcross Unit.

The Xcross Unit can operate independently or in combination with or a part of other equipment, such as what is described in this invention. The apparatus or Xcross Unit is most advantageous in a 3N+2 configuration consisting or three (3) input sources of power and three (3) output assembly or distribution systems configured in a triangular configuration (as illustrated in FIG. 1). The Xcross Unit can consist of a housing, single or multiple electrical bus bars for electrical connections, single or multiple electronic and/or mechanical switches and/or breakers, input assembly, output assembly, single or multiple source connection assembly, bi-directional assembly and electronic or mechanical sensing and control assembly. The Xcross Unit seamlessly connects power of two or more sources, such as source "A", "B", and "C", to one or more loads, such as load "A", "B" and "C", with criss-cross, bi-directional connection capability (crossing the power from any connected power sources to any connected loads in either direction).

In the example illustrated in FIG. 3, 2N Xcross transfer switch 206 connects power sources A and B through two source input switches 302, 304 (i.e., the input assembly) and includes a bi-directional switch assembly 306 (i.e. the switch assembly) and two output switches 308, 310 (i.e., the output assembly).

This will result in a delivery of 2N+1 for two sources of power, and 3N+2 for three sources of power. For example, the 2N+1 can connect source "A" to load "A" and/or load "B" and/or source "B" to load "B" and/or load "A" or both together at the same time. The Xcross Unit can operate 2N or multi-N power input sources and connect the sources to 2N or multi-load outputs that are capable of crossing the inputs and outputs from one side to the other or a combination thereof. For the purpose of this invention, crossing between sources and loads in a single or bidirectional manner is also called Criss-cross or Xcross. For example, the 2N+1 Xcross Unit can alternately operate, transfer and/or combine multiple alternating current (AC) power sources and/or multiple direct current (DC) power sources, such as utility power, generator power, UPS power, PDU s, batteries or battery banks, and connect and pass through the power from multiple or single sources to multiple or single output loads. The Xcross Unit can additionally operate as a battery system transfer and combiner apparatus that can be connected to, among other, single or multiple batteries or battery banks, UPS systems, inverters and/or rectifiers.

The Xcross Unit's input assemblies are configured to be connected to one or multiple electrical power supply systems and/or sources. For example, commercial power supplies, standby or prime generators, uninterruptible power supplies, DC converters or batteries. The Xcross Unit, and in particular, the housing, is sized and designed to be conveniently free standing, mountable to a rack system, wall or existing equipment, and/or combined within other devices described in this invention and/or other conventional equipment, such as server racks, UPS systems, PDU s, manual or automatic transfer switches (ATSs), or in any other convenient equipment or location. The convenience and flexibility of the present invention provides substantial benefits relative to conventional, distribution, transfer switches, switchgears, wiring methods, free-standing and large or bulky equipment, such as switchgears or PDU's.

Unlike conventional N+1 configuration of equipment, such as static switches or transfer switches comprising of two input source connection assemblies and a single load output connection, the present invention advantageously connects to multiple input sources, such as 2N or sources "A" and "B", to one or more output loads, such as "A and "B" load, selectively, individually, or in combination. For example, the 2N+1 Xcross Unit can connect source "A" to load "A" and source "B" to load "B". Additionally, the 2N+1 Xcross Unit can connect source "A" to load "A" and/or load "B" at the same time, isolating or combining source "B". Alternately, the 2N+1 Xcross Unit can connect source "B" to load "A" and/or load "B" at the same time, isolating source "A". It can also combine and utilize both sources "A" and "B" to connect to load "A" and "B" at the same time. The operational functions of the 2N+1 or 3N+2 Xcross Unit can be electronically and/or mechanically controlled.

In addition and as illustrated in FIG. 3, Xcross Unit advantageously comprises a multiple busbar system assembly configured to the number of parallel paths and sources of power available, such as IN, 2N or xN configurations. The multiple busbar system assembly is contained within the housing of the Xcross Unit and in communication with the input assembly, switch assembly and output assembly. The electrical power output assembly may comprise contact points along the busbar assembly. The bi-directional assembly is in communication with each of the independent parallel paths of power within the assembly. For example, between side "A", side "B" and/or side "C" for 3N system configuration.

The busbar assembly may include one or more sets of busbars for each source and each electrical phase. The busbar assembly includes a plurality of electrically conductive bars. For example, a plurality of spaced apart copper rods, arranged in a generally spaced apart, generally parallel or triangular alignment with one another (see FIG. 10).

Alternatively, the busbars may comprise electrically conductive hollow rods. For example, hollow tubes, spaced apart by a distance about equal to an outer diameter of the tubes. Other configurations and arrangements are possible and are considered to be within the scope of the invention.

The busbar assembly could include at least one neutral busbar. The busbar assembly may additionally include a ground busbar, or the busbar assembly may be grounded by connecting the conductive busbars to another appropriate grounding structure. For example, a structure within or on the housing.

The apparatus can further be comprised of transformers, circuit breakers, electronic circuitry, and an electrical metering or measuring device for the output assemblies and for each source and load source such as in an "xN" configuration. The output assemblies can be put together to include multiple or single breakers, lugs and/or receptacles per module. Each module could be changed or replaced while the total assembly is powered up and in operation.

The apparatus further comprises multiple plug-in modules containing breakers and/or electrical lugs in communication with the contact points. The breaker and/or switches may be located substantially in the housing of the Xcross Unit. For example the breaker or output contact point may be mounted in a circuit panel of the housing or a removable assembly.

In another aspect of the invention, each of the output connections may include an individually operable circuit breaker, although more than one output contact point can be associated with the same circuit breaker.

The present apparatus may be adapted for receiving and distributing multiple sources of single phase power, thus making it convenient for small electrical applications. The apparatus, however, may also be adapted for use with multiple sources, such as "xN' configuration. The input assembly is adapted to be electrically connected to a single phase electrical power supply, or alternately to a three phase electrical power supply (as illustrated in FIG. 3).

The electrical power input assembly may further be comprised of one or more meters. For example, a meter located substantially in the housing, adapted to monitor at least one property of the electrical power passing through the input assembly. The meter may be a voltage meter for monitoring voltage being provided to the apparatus. More sophisticated meters may be employed to provide enhanced electrical power monitoring. Any and all features described herein and combinations of such features are included within the scope of the present invention provided that the features of any such combinations are not mutually inconsistent.

Figure 4:
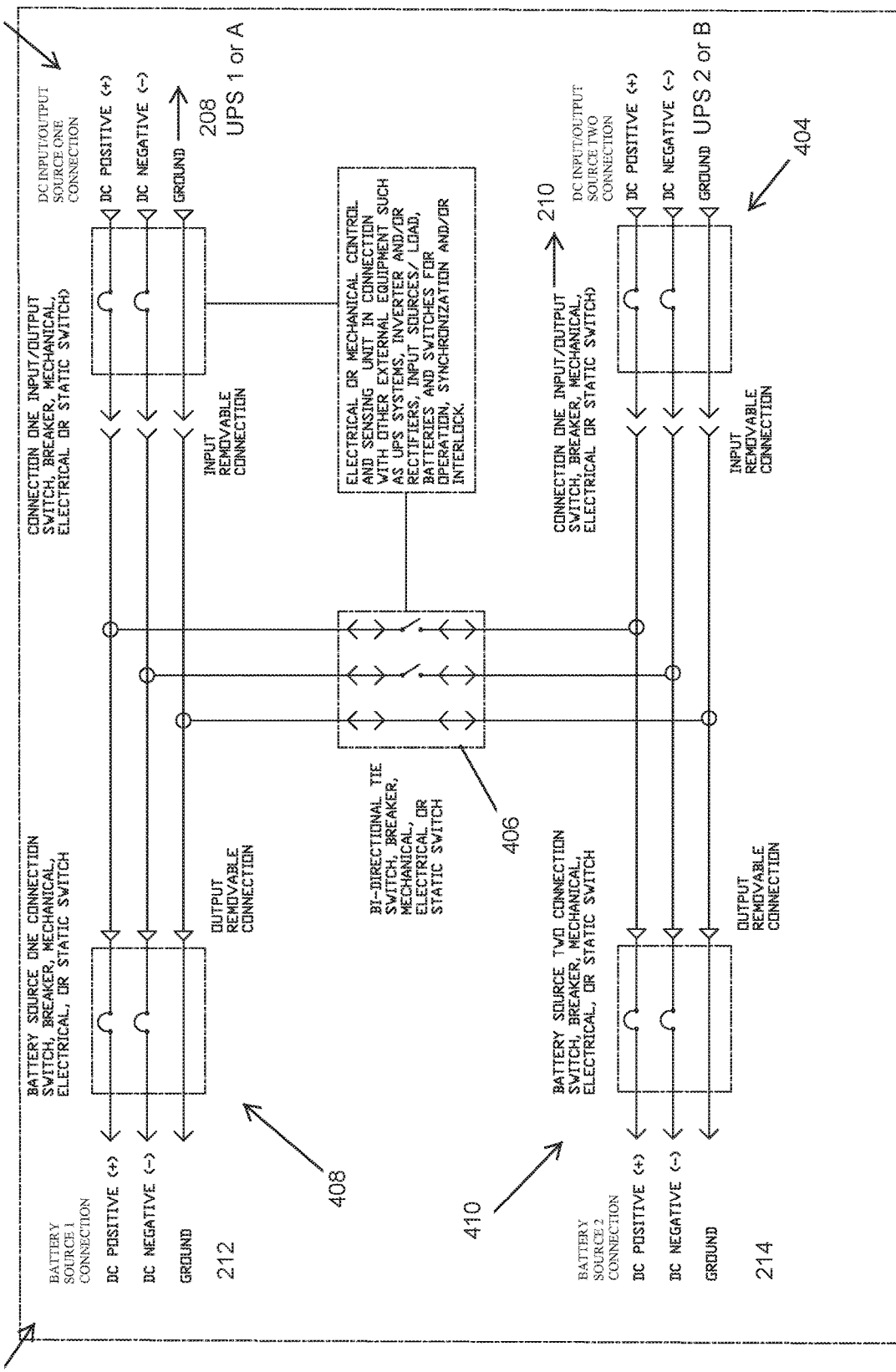
FIG. 4 an electrical schematic of the wiring of one example of a BTXcross of the present invention.

FIG. 4 is an electrical schematic of the wiring of the BTXcross 216 of the present invention. The BTXcross 216 is a DC power or battery system, bi-directional power combiner, transfer system, and/or distributer that can connect single or multi-input and output DC power sources and/or DC power loads that connects to a polarity of single IN, or 2N or multi-battery banks or other DC storage devices (e.g., battery 1 and 2, 212, 214 of FIG. 2). The BTXcross can connect multi battery banks or DC storage devices to multiple inverters, UPS systems or other types or loads.

In one broad aspect, the BTXcross is an electrical power distribution apparatus that can be comprised of an input 402, 404 and output 408, 410, and an electrical connection assembly that can connect a single or multiple of DC power sources and load, a DC storage connection assembly for connection of one or multiple battery banks and/or other DC storage equipment to the apparatus, a multiple of breakers and/or switch assembly to the apparatus, and a bi-directional connection assembly 406. The BTXcross assemblies, such as the input and output assembly 402, 404, 408, 410 respectively, are configurable to connect to designated input and output DC sources and/or loads, and pass through the DC power or load to the DC storage equipment, such as batteries. For example, the BTXCROSS can connect two separate UPS systems to two separate DC storages, such as battery bank "A" and battery bank "B". The apparatus can connect the input and output assemblies to either input power source "A" or "B" or both inputs at the same time. This is advantageous in the event of power loss of one of the connected input sources.

The BTXcross can connect to an isolated 2N or multiple UPS systems design, where each UPS connects to its isolated battery bank. For example, UPS system "A" and UPS system "B". In the event of a UPS failure (either UPS "A" or "B"), the BTXcross apparatus in this invention can re-route and/or connect the batteries of the failed UPS to the UPS in operation. The BTXcross apparatus logic circuitry can connect to the logic circuitry of UPSs "A" and/or "B", to monitor and control the BTXcross apparatus operation and to automatically transfer, re-assign and/or re-connect the battery banks or the failed UPS equipment to the UPS equipment in operation. This invention is advantageous in reducing fire hazard in building by reduction in the total electrolyte, and reduction in initial and continuous cost of batteries.

Figure 5:
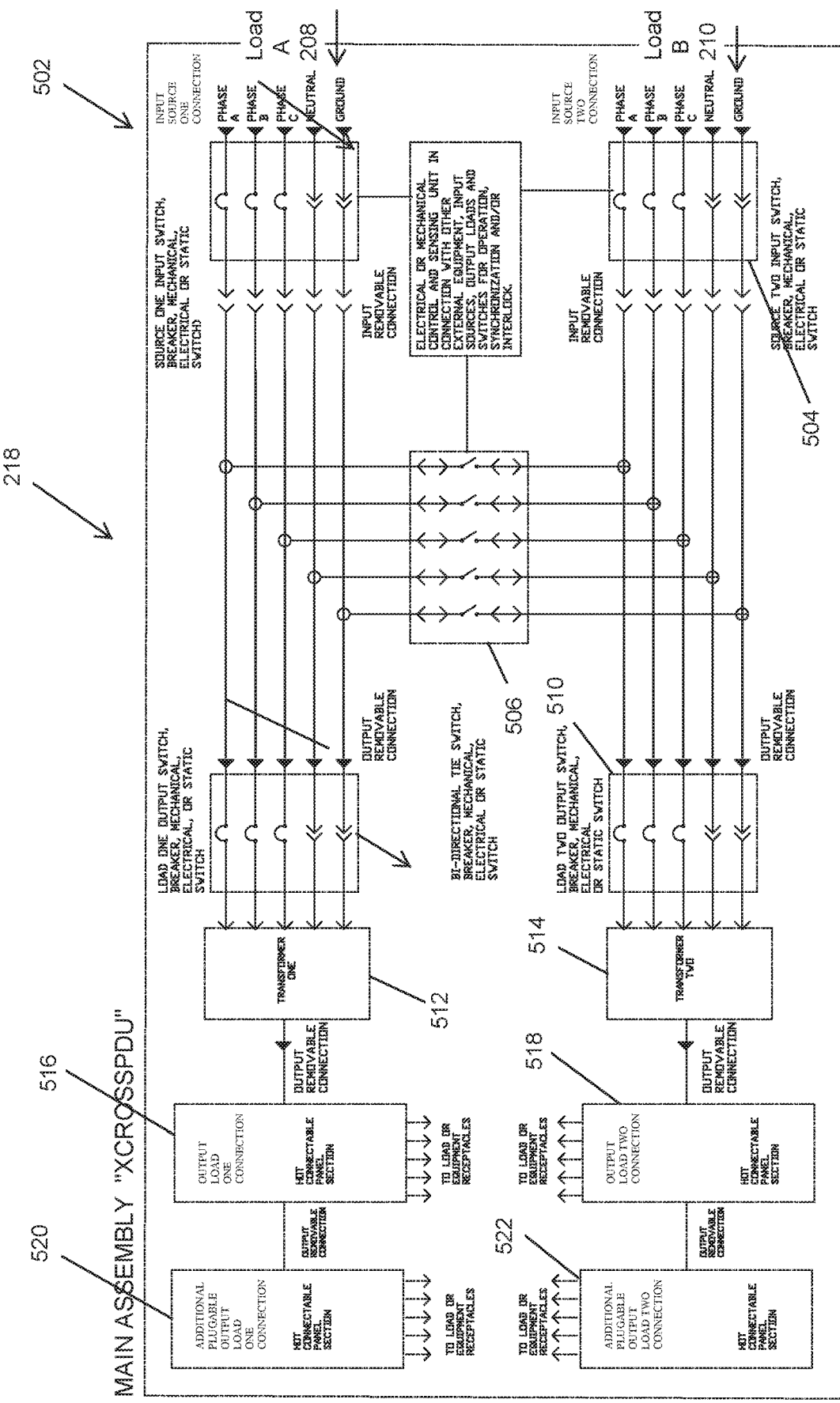
FIG. 5 is an electrical schematic of the wiring of one example of an XcrossPDU of the present invention.

FIG. 5 is an electrical schematic of the wiring of one example of an XcrossPDU 218 of the present invention. The XcrossPDU 218 can be a 2N+1 and/or a 3N+2 Power Distribution Unit ("PDU") and can receive a single IN input power source or 2N or multi "xN" power sources that passes and connect the power to a polarity of single IN, or 2N or multi load. The XcrossPDU in a 2N+1, multi-source and multi-load configuration can combine and/or transfer the power from any one or combination of sources to any load or combination loads. The XcrossPDU can connect to IN, 2N or multi-N sources or IN, 2N, or multi-N loads and increase the system redundancy and reliability.

As illustrated in FIG. 5, the XcrossPDU 218 can includes input switches 502, 504 (i.e. input assemblies), a bi-directional tie switch 506, output switches 508, 510 (i.e., output assemblies). The output assemblies 508, 510 can respectively connect to transformers 512, 514 and hot connectable power switches 516, 518, 520 and 522 to deliver power to multiple loads/equipment.

The XcrossPDU is expandable while in operation or service, usually called hot expandable, to accommodate future output load connections, such as panel additions, and additional connections of input sources or equipment. The XcrossPDU can be equipped and wired with a plug-in connector, such as Anderson connectors, for connection of additional sections to the XcrossPDU without the need for shutdown of the unit. For example, the input and/or output electrical connection assembly can be prewired connecting the input and/or output power assemblies in the XcrossPDU to one side of a cable with a plugin connection at the other end.

In one broad aspect, the XcrossPDU is an electrical power distribution apparatus that can connect to a single or multiple of power sources and that can be comprised of a busbar assembly in communication with the input 502, 504, output 508, 510 and/or transformer assembly 512, 514, single or multiple transformer assembly for each source and load configuration, such as in "xN" configuration, bi-directional assembly 506, electronic and/or mechanical sensing and control assembly, and multiple changeable expandable swappable output panels, breakers and/or plug-in electrical power output assemblies 516, 518, 520, 522. Each output point breaker, panel or receptacle is configurable to connect to the chosen input source. For example, in a two input power source (2N), the output distribution could be located on any side of the apparatus and the modules could be mounted on the top of the apparatus. The apparatus could connect the output assemblies to either input power source "A" or "B" or both inputs at the same time. This is advantageous in the event of system and equipment failure and/or loss of any of the connected power sources at any location in the facility power system.

Figure 6:
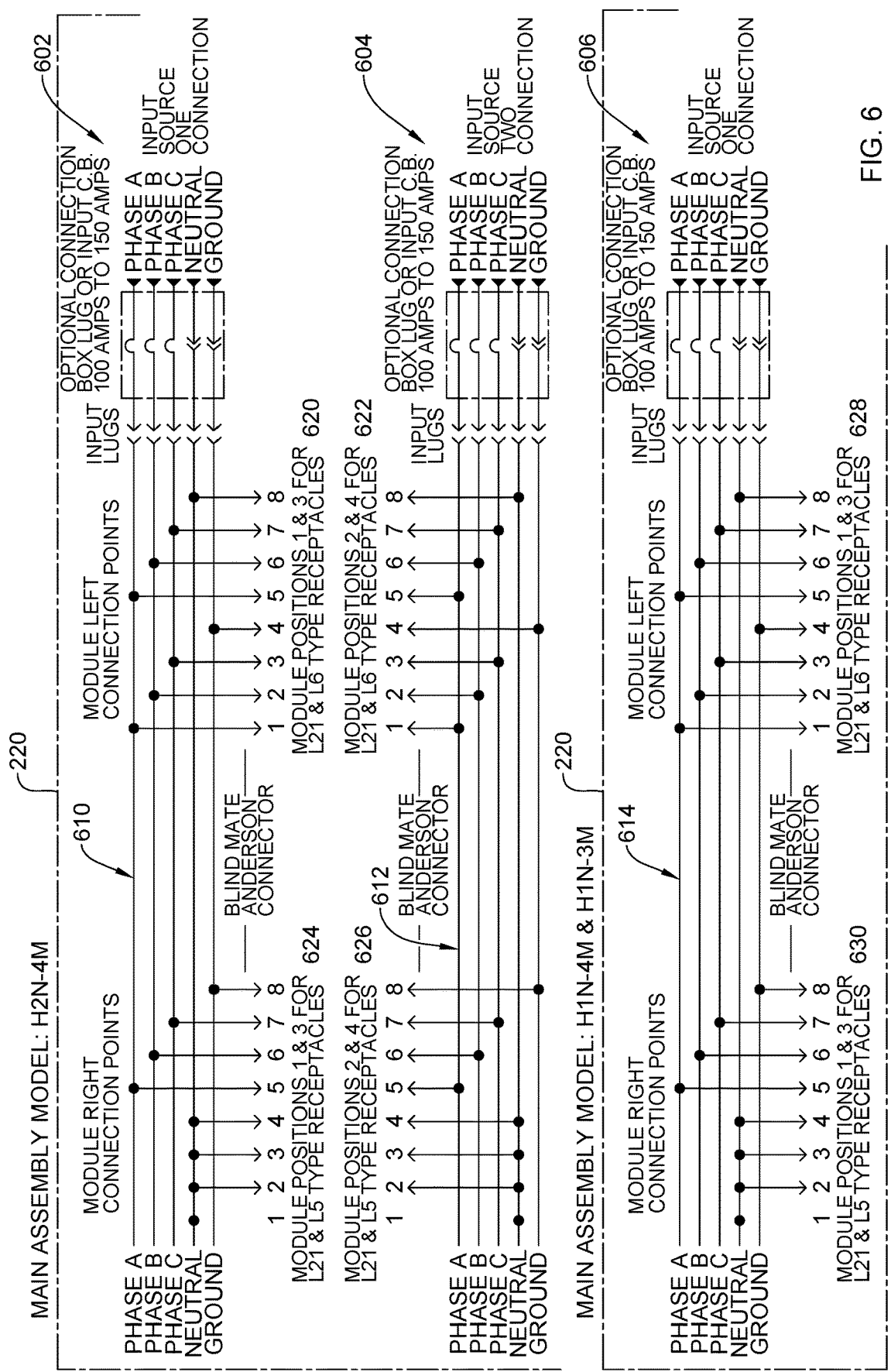
FIG. 6 is an electrical schematic of one example of busbar wiring of an HPDU of the present invention.

FIG. 6 is an electrical schematic of one example of busbar wiring of an HPDU 220 of the present invention. The device, which for the purposes of this invention is called "HPDU," is in one broad aspect an electrical power distribution apparatus that is comprised of an electrical power input assembly 602, 604, 606, consisting of single or multiple power sources and loads, and multiple swappable plug-in electrical power output assemblies that may have multiple connection points 620, 622, 624, 626, 628 and 630 (such as plug-in receptacles, modules or breakers 620, 622, 624, 626, 628 and 630 for connecting the power from the one or multiple input assemblies 602, 604, 606 and/or sources to the electrical equipment connected to the apparatus). The HPDU apparatus can include all or part of the Xcross Unit 206 described above. The input assemblies are configured to be connectable to one "IN" or multiple "xN" electrical power supply systems (such as, commercial power supplies or other power sources such as UPSs).

Like the XcrossPDU, the output assemblies of the HPDU 620, 622, 624, 626, 628 and 630 can be equipped and wired with plug-in connectors, such as Anderson connectors, for connection of additional sections to the HPDU without the need for shutdown of the unit. For example, output electrical connection assembly 620, 622, 624, 626, 628 and 630 can be prewired connecting the output power assemblies in the HPDU to one side of a cable with a plugin connection at the other end. The example schematics of various examples of such plugin modules that from part of the output electrical connection assembly 620, 622, 624, 626, 628 and 630 are illustrated in FIGS. 7a, 7b and 7c.

Figure 7A:
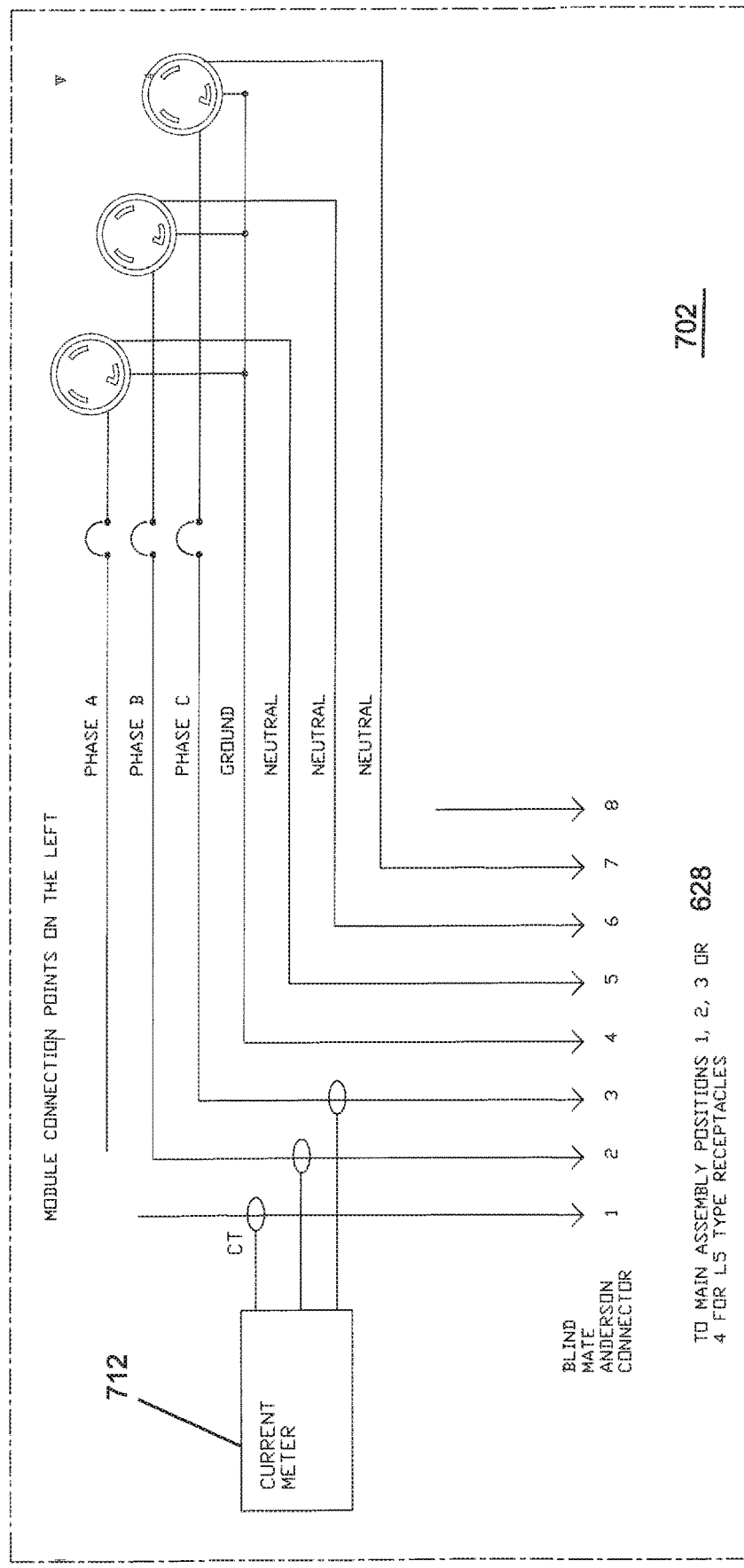
FIG. 7a illustrates a module that may be interconnected with an electrical output connection assembly of FIG. 6.
Figure 7B:
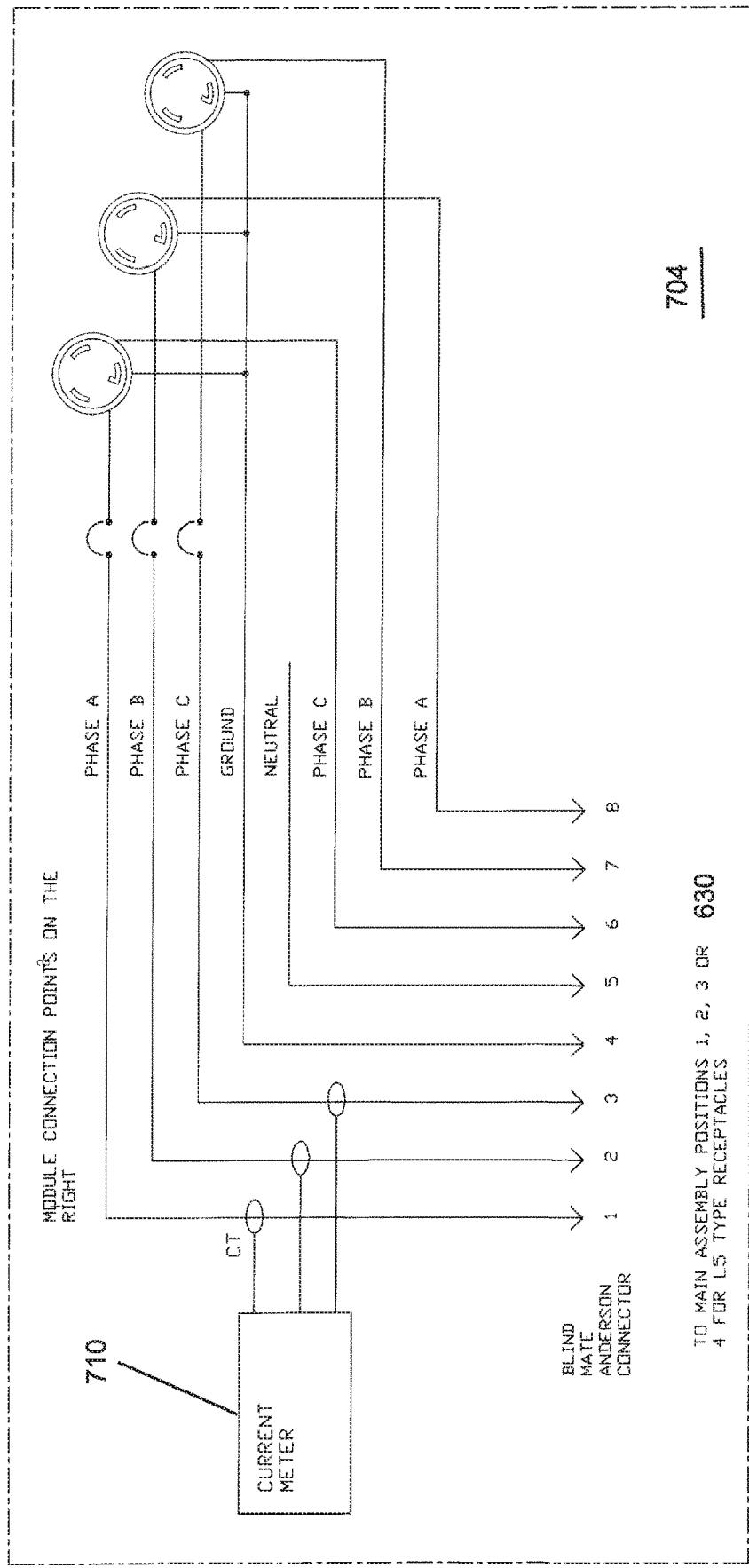
FIG. 7b illustrates a module that may be interconnected with an electrical output connection assembly of FIG. 6.
Figure 7C:
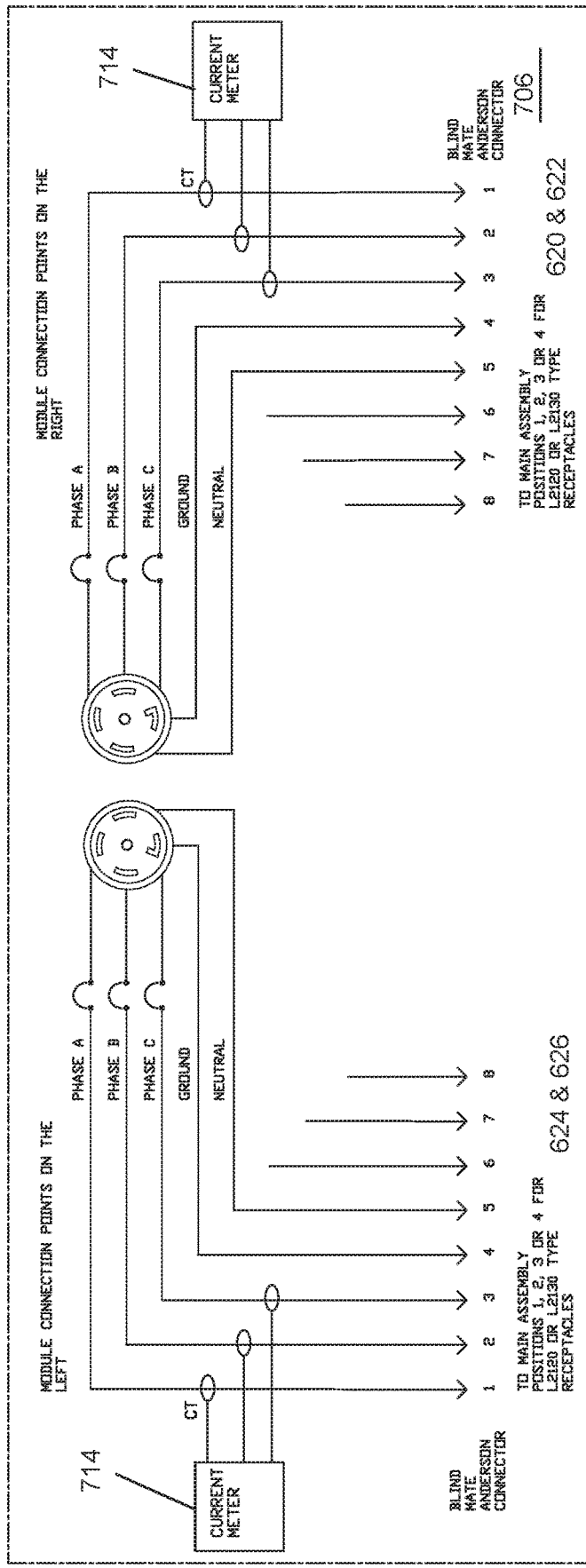
FIG. 7c illustrates a module that may be interconnected with an electrical output connection assemblies of FIG. 6.

FIGS. 7a, 7b and 7c illustrate different examples of electrical modules 702, 704 and 706 that form part of the output electrical connection assembly 620, 622, 624, 626, 628 and 630. The electrical modules 702, 704 and 706, as described above, are designed as plug in connectors and are removable modules 702, 704 positioned along the face of the HPDU for connection with electrical equipment.

FIG. 7a illustrates a module 702 that may be interconnected with the electrical output connection assembly 630 of FIG. 6. The module 702 mates through plug connectors, such as Anderson connectors, and provides three electrical phases, a ground and three neutral connections. The module 702 also includes is a current meter reader 710, which can be viewed from the face of the module 702.

FIG. 7b illustrates a module 704 that may be interconnected with the electrical output connection assembly 628 of FIG. 6. The module 702 mates through plug connectors, such as Anderson connectors, and provides two connections to the three electrical phases a ground and a neutral connection. The module 704 also includes is a current meter reader 712, which can be viewed from the face of the module 702.

FIG. 7c illustrates a module 706 that may be interconnected with the electrical output connection assemblies 624 & 626 or 620 and 622 of FIG. 6. Again, the module 706 mates through plug connectors, such as Anderson connectors, and provides connections to the three electrical phases, a ground and a neutral connection. Three additional connections (6-8) are also available for each connection assembly 624 & 626 or 620 and 622. Depending upon the electronical connections 6-8 may be neutral connections or provided additional connections to phases A-C. The module 704 also includes is current meter readers 714 on for both outputs, which can be viewed from the face of the module 706.

FIGS. 8a, 8b, 8c and 8d illustrate an example housing 802 of the HPDU of the present invention. FIG. 8a is a top perspective view of the housing 802 illustrating the removable modules 802 on the front the housing. FIG. 8b is a top view of the housing 802. FIG. 8c is a side view of the housing 802. FIG. 8d is a front view of the housing 802 showing the removable modules 804.

As illustrated, the HPDU is sized and designed to be conveniently mounted on the top or side of server racks, beneath a computer room floor, to a wall above a computer rack, suspended from the ceiling or in any other convenient location. The convenience and flexibility of the HPDU provides substantial benefits relative to conventional wiring methods and free-standing and large or bulky PDU's.

Figure 9B:
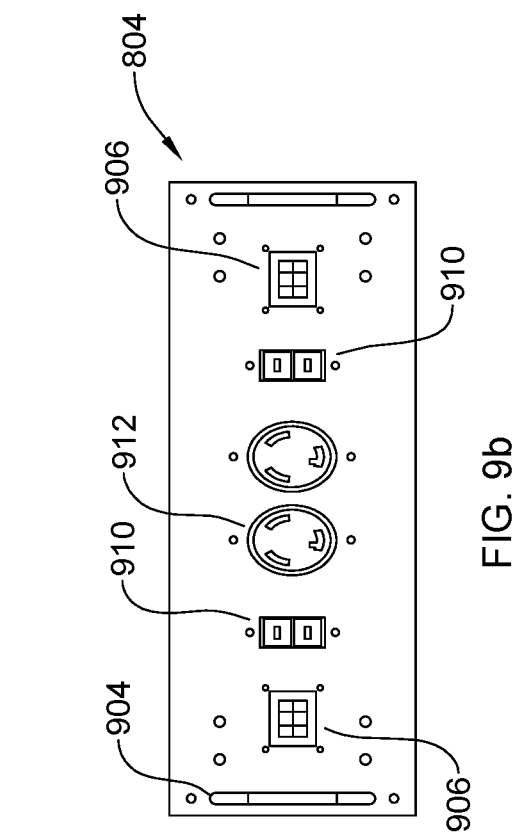
FIG. 9b illustrates a front view of a removable electrical module of the present invention.
Figure 9A:
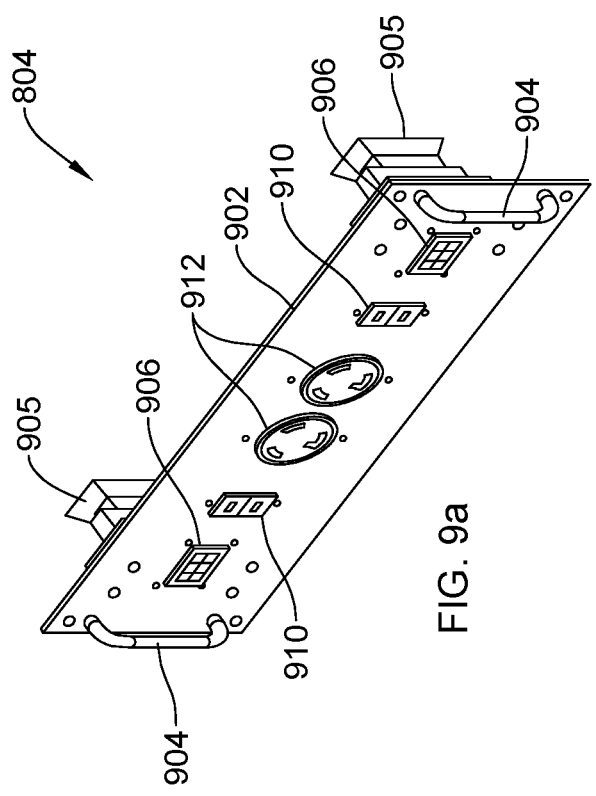
FIG. 9a illustrates a top perspective view of a removable electrical module of the present invention.
Figure 9C:
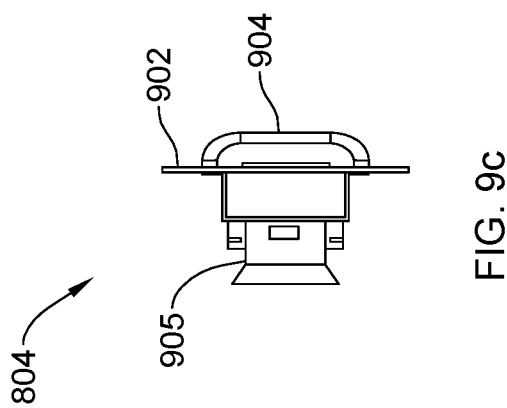
FIG. 9c illustrates a side view of a removable electrical module of the present invention.

FIGS. 9a-9c illustrate one example of an electrical module 804 of the present invention. FIG. 9a illustrates a top perspective view of the electrical module 804 of the present invention. FIG. 9b illustrates a front view of the electrical module 804 of the present invention. FIG. 9c illustrates a side view of the electrical module 804 of the present invention.

As illustrated in FIGS. 9a-9c, the electrical module 804 a face plate 902 and handles 904 for removing the module 804 from the HPDU. The electrical module 804 further includes electrical connectors 905 for interfacing with the electrical outputs (as illustrated in FIGS. 6, 7a, 7b and 7c). The face plate 102 of the electrical module 804 further includes visual output 906 for the current voltage meters and circuit breakers 910 and electrical receptacles 912 for interfacing with the electrical equipment.

As illustrate in connection with FIGS. 7a, 7b, 7c, 8a-d and 9a-c, the HPDU may further comprise multiple plug-in receptacles in communication with the contact points. The receptacles may be located substantially in the housing. For example, the receptacles may be mounted in a circuit panel of the housing or a removable assembly. Each removable assembly could be in connection with one or more sources of power.

In another aspect of the HPDU, each of the receptacles may include an individually operable circuit breaker, although more than one receptacle can be associated with the same circuit breaker.

The HPDU may be adapted for receiving and distributing single phase power, thus making it convenient for small electrical applications. The HPDU, however, may also be adapted for use with three phase power. The input assembly is adapted to be electrically connected to a single phase electrical power supply, or alternately to a three phase electrical power supply.

The electrical power input assembly may further comprise a meter, located substantially in the housing and adapted to monitor at least one property of the electrical power passing through the input assembly. For example, the meter may be a voltage meter for monitoring voltage provided to the HPDU. More sophisticated meters may be employed to provide enhanced electrical power monitoring. For example, a multi-function monitor, such as the Shark 200 model sold by Electro Industries, may be advantageously employed.

FIGS. 10a-10d illustrate one example of a bus bar assembly 1002 of the present invention. FIG. 10a illustrates a top view of one example of bus bar assembly 1002. FIG. 10b illustrates a side view of one example of a bus bar assembly 1002. FIG. 10c illustrates a bottom perspective view of the bus bar assembly 1002. FIG. 10d illustrates a side view of one example of a bus bar assembly 1002.

Unlike conventional PDUs that have bundles of electrical cables located within a housing for providing electrical connection between a power input to power output (e.g. receptacle), the HPDU comprises a busbar assembly configured in a single or multiple source and load "xN" configuration that is contained within the housing and in communication with the input assembly or assemblies 602, 604, 606. The electrical power output assembly may comprise contact points along the busbar assembly.

The busbar assembly may include one or more sets of busbars for each electrical phase and each electrical source. As illustrated in FIG. 10, the busbar assembly may include a plurality of electrically conductive bars 1004, for example, a plurality of spaced apart copper rods, arranged in a generally spaced apart, generally parallel or triangular alignment with one another.

In one example, each busbar comprises a copper bar having a rectangular cross section. The spacing between adjacent rectangular busbars is about equivalent to the width of the busbars. For example, each rectangular copper busbar has a width of about 0.5 inches and spacing between adjacent busbars is about 0.5 inches. Generally, in accordance with one aspect of the invention, spacing between adjacent busbars is approximately between 0.5 inches to about 2.0 inches.

Alternatively, the busbars may comprise electrically conductive hollow rods, for example, hollow tubes, spaced apart by a distance about equal to an outer diameter of the tubes.

Other configurations and arrangements are possible and are considered to be within the scope of the invention.

The busbar assembly could include at least a neutral busbar. The busbar assembly may additionally include a ground busbar, or the busbar assembly may be grounded by connecting the conductive busbars to another appropriate grounding structure. For example, a structure within or on the housing. Each of the busbars may be electrically insulated, for example, by means of heatshrunk tubing applied along a length thereof. Output assembly contact points may comprise regions of a busbar which are exposed through the tubing.

It will be understood, and is appreciated by persons skilled in the art, that one or more processes, sub-processes, or process steps described may be performed by hardware and/or software. If the process is performed by software, the software may reside in software memory (not shown) in a suitable electronic processing component or system such as, one or more of the functional components or modules schematically depicted. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In one embodiment, the apparatus described herein is known as a BusX and is used to provide an electrical coupling between any of the devious described herein, including conventional electrical devices, such as, but not limited to UPSs and/or PDUs. The apparatus is in a broad aspect an electrical power distribution devices that includes copper buses that include multiple electrical power input assemblies and/or multiple power output assemblies, that can connect to a single or multiple power sources to enable power to be delivered to single or multiple loads. For example, the device can include multiple copper buses, input and output connection assemblies that are plug-in or that are hard-wired, for use in coupling the power from the one or multiple input assemblies and/or sources to an load coupled the apparatus.

In one embodiment, the input assemblies are configured to be connectable to one "1N" or multiple "xN" electrical power supply systems, such as, for example, commercial power supplies or other power sources such as UPSs or PDUs. The apparatus may be sized and designed to be conveniently suspended from ceilings, mounted on floor stands beneath a computer room floor and/or mounted atop of computer room row of racks. The functionality, convenience and flexibility of the apparatus provides substantial benefits relative to conventional wiring methods to facilitate connection of power source equipment to load equipment.

Unlike conventional wiring that generally include multiple runs of electrical conduits and cables for providing electrical connection between a power inputs to power outputs, the apparatus described herein can include a busbar assembly configured in a single or multiple input sources and output load "xN" configuration that several sources of power that is contained within the same housing and in communication with the input or output assemblies. The electrical power output assembly may also include contact points spaced along the busbar assembly. The busbar assembly may include one or more sets of busbars for each electrical phase and each electrical source. In one embodiment, the busbar assembly may include a plurality of electrically conductive bars, for example, a plurality of spaced-apart copper rods, arranged in a generally spaced-apart orientation with the rods generally parallel or in a triangular alignment with one another. For example, in one embodiment, each busbar includes a copper bar having a rectangular cross section, and the spacing between adjacent rectangular busbars may be about equivalent to the width of each individual busbar. Alternatively, the busbars may include electrically-conductive hollow rods, such as, for example, hollow tubes, spaced apart by a distance about equal to an outer diameter of the tubes. Other configurations and arrangements such as triangular copper rods are possible and are considered to be within the scope of the invention.

The busbar assembly could include at least a neutral busbar. The busbar assembly may also or alternatively include a ground busbar. Moreover, in other embodiments the busbar assembly may be grounded by connecting the conductive busbars to another appropriate grounding structure. In each embodiment, the busbars may be electrically insulated, for example, by means of plastic sleeves or heat-shrunk tubing applied along a length thereof. Output assembly contact points may include regions of a busbar which are exposed through the tubing.

In one embodiment, the apparatus also includes a single or multiple plug-in connection point to enable connection to the input and/or output assemblies. The output assemblies can include multiple connection points for the load distribution such as the HPDU, such that each HPDU could be selectively relocated, exchanged, and/or replaced while the total assembly remains energized and in operation. Moreover, the apparatus may be adapted to receive and distribute single phase power, thus making it convenient for small electrical applications. Alternatively, the apparatus may be used with three phase power. The input assembly is adapted to be electrically connected to a single phase electrical power supply, or alternately to a three phase electrical power supply.

The electrical power input assembly may further comprise a meter, for monitoring at least one property of the electrical power, such as the current, passing through the input assembly. For example, the meter may be a voltage meter for monitoring voltage provided to the apparatus. More sophisticated meters may be employed to provide enhanced electrical power monitoring, such as sold commercially by Electro Industries, for example.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

It will be understood that when two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or submodule.

The fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation.

Any and all features described herein and combinations of such features are included within the scope of the present invention, provided that the features of any such combinations are not mutually inconsistent.

What is claimed is:

1. An electrical power distribution system comprising:
    at least a first power source input switch coupled to a first input source and a second power source input switch coupled to a second input source;
    at least a first power source output switch and a second power source output switch;
    said first power source input switch and said first power source output switch comprising at least a first and second electrical power connection therebetween;
    said second power source input switch and said second power source output switch comprising at least a third and fourth electrical power connection therebetween; and
    a bidirectional switch electrically coupling said first electrical power connection to said third electrical power connection and electrically coupling said second electrical power connection to said fourth electrical power connection, whereby said bidirectional switch can selectively cause the first input source from said first power source input switch to be delivered to said second power output switch and can selectively cause the second input source from said second power input switch to be delivered to said second power output switch.

2. The electrical power distribution system of claim 1 wherein said bidirectional switch can selectively cause the first input source from said first power source input switch to be delivered to said second power output switch and can independently cause the second input source from said second power input switch to be delivered to said second power output switch.

3. The electrical power distribution system of claim 1 wherein said bidirectional switch can cause the first input source from said first power source input switch to be delivered to said second power output switch and can simultaneously cause the second input source from said second power input switch to be delivered to said second power output switch.

4. The electrical power distribution system of claim 1 wherein said bidirectional switch can selectively isolate said second power output switch from one of said first power source input switch and said second power source input switch.

5. The electrical power distribution system of claim 1 wherein said bidirectional switch can selectively couple said second power output switch simultaneously to said first power source input switch and said second power source input switch.

6. The electrical power distribution system of claim 1 further comprising a meter coupled within said system for monitoring electrical power current within said system.

7. A power distribution system comprising:
    a plurality of power source input switches coupled to a input source;
    a plurality of power source output switches, wherein a first of said power source output switches is coupled to a first of said plurality of power source input switches with at least a first power connection and a second power connection, and wherein a second of said power source output switches is coupled to a second of said plurality of power source output switches with at least a third power connection and a fourth power connection; and
    at least one switch coupled between said first power connection and said third power connection, and between said second power connection and said fourth power connection for selectively isolating said second power output switch from one of said first power source input switch and said second power source input switch.

8. The power distribution system of claim 7 wherein said at least one switch is further configured to enable power from said first power input switch to be delivered to said first power output switch while power from said second power input switch is delivered to said second power output switch.

9. The power distribution system of claim 7 wherein said at least one switch can selectively isolate said second power output switch from one of said first power source input switch and said second power input switch.

10. A method of assembling an electrical power distribution assembly, said method comprising:
    coupling a plurality of power source input switches to a input source;
    coupling at least a first of said power source input switches to at least a first power output switches such that at least a first and a second electrical power connection extends there between;
    coupling at least a second of said power source input switches to at least a second power output switches such that at least a third and a fourth electrical power connection extends there between; and
    coupling a bidirectional switch between the first electrical power connection and the third electrical power connection, and between the second electrical power connection and the fourth electrical power connection, such that the bidirectional switch can:
  selectively cause the input source from the first power source input switch to be delivered to the second power output switch; and
  selectively cause the input source from the second power input switch to be delivered to the second power output switch.

11. The method of claim 10 wherein coupling a bidirectional switch further comprises coupling a bidirectional switch within the electrical power distribution assembly.

12. The method of claim 10 wherein coupling a bidirectional switch further comprises coupling the switch within the electrical power distribution system to enable the second power output switch to be selectively isolated from one of the first power source input switch and the second power source input switch.

13. The method of claim 10 wherein coupling a bidirectional switch further comprises coupling the switch within the electrical power distribution system to enable the second power output switch to be coupled simultaneously to the first power source input switch and to the second power source input switch.

14. The method of claim 10 further comprising coupling a meter within the power distribution assembly for monitoring electrical power current within the distribution assembly.

* * * * *